March 5, 1963 T. R. THOMAS 3,080,016
LUBRICATION
Filed Sept. 16, 1959 4 Sheets-Sheet 1
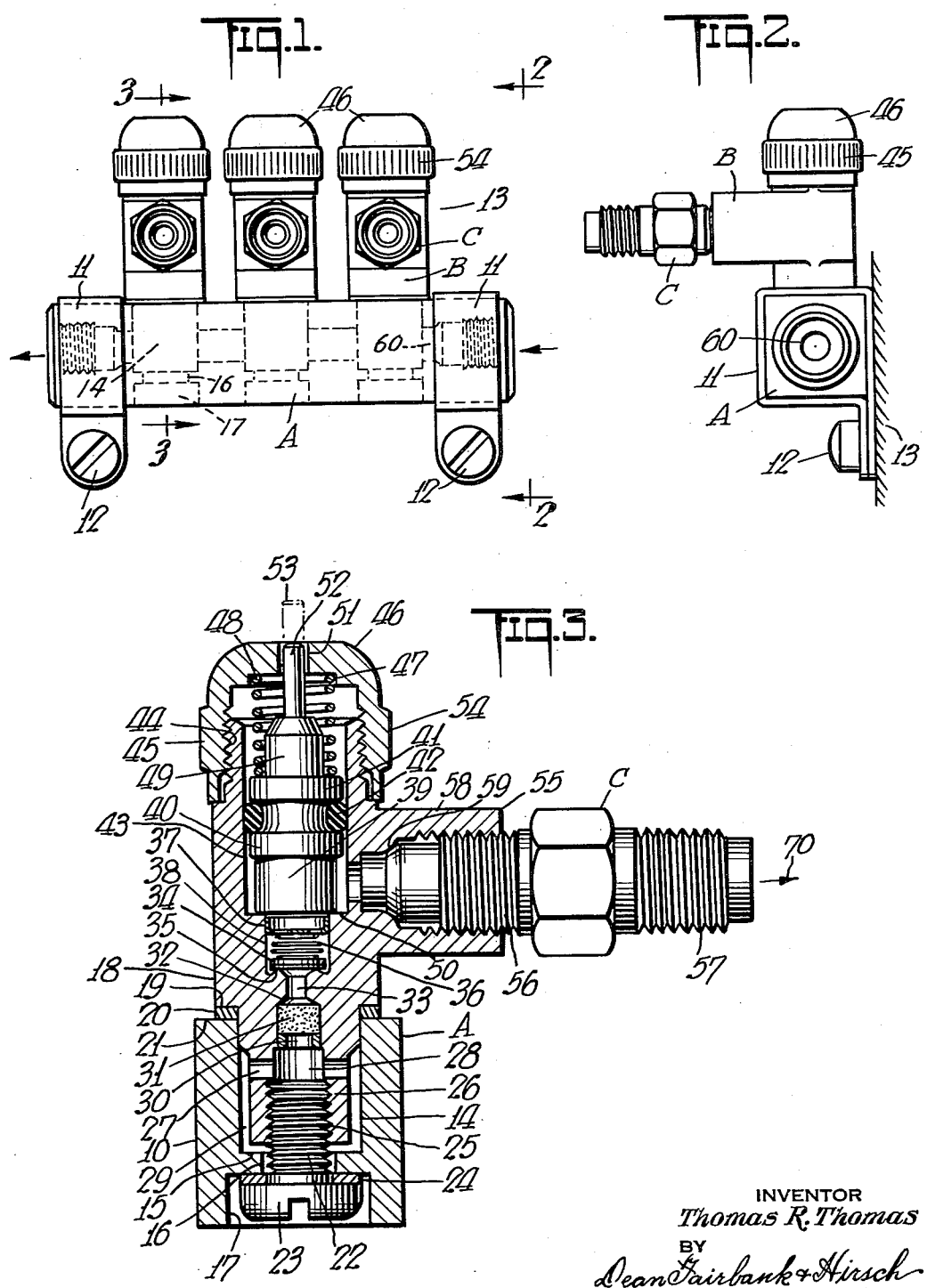
INVENTOR
Thomas R. Thomas
BY
Dean Fairbank & Hirsch
ATTORNEYS.

March 5, 1963 T. R. THOMAS 3,080,016
LUBRICATION
Filed Sept. 16, 1959 4 Sheets-Sheet 2
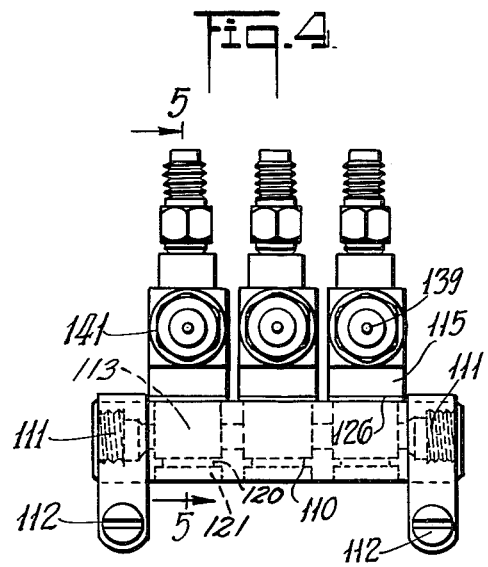
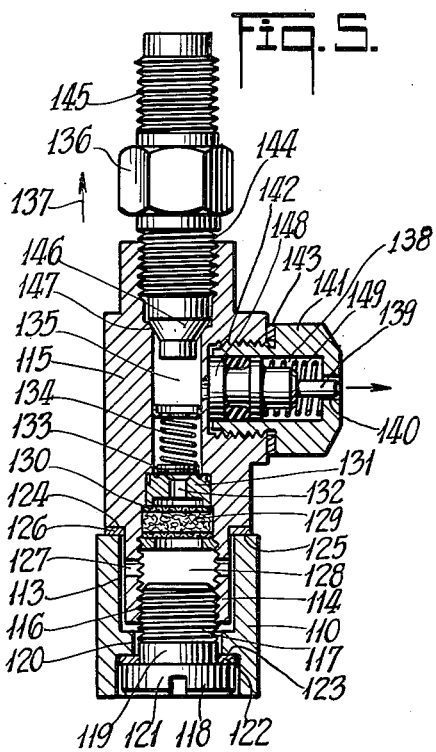
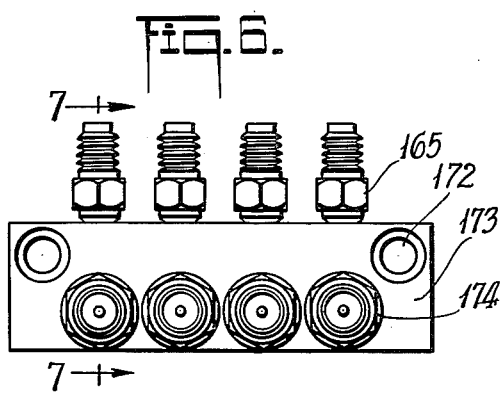
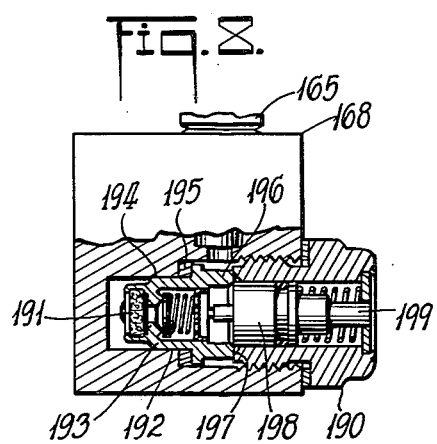
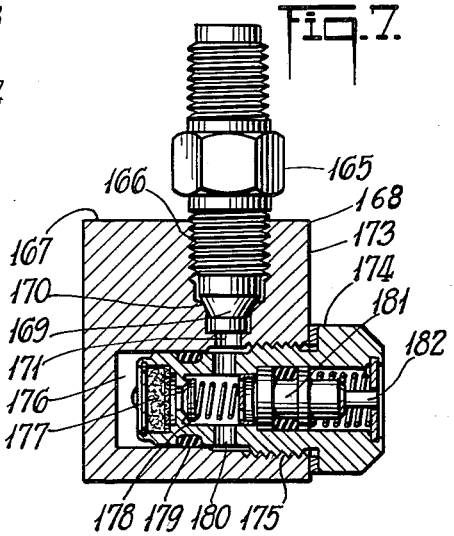
INVENTOR
Thomas R. Thomas
BY
Dean Fairbank & Hirsch
ATTORNEY

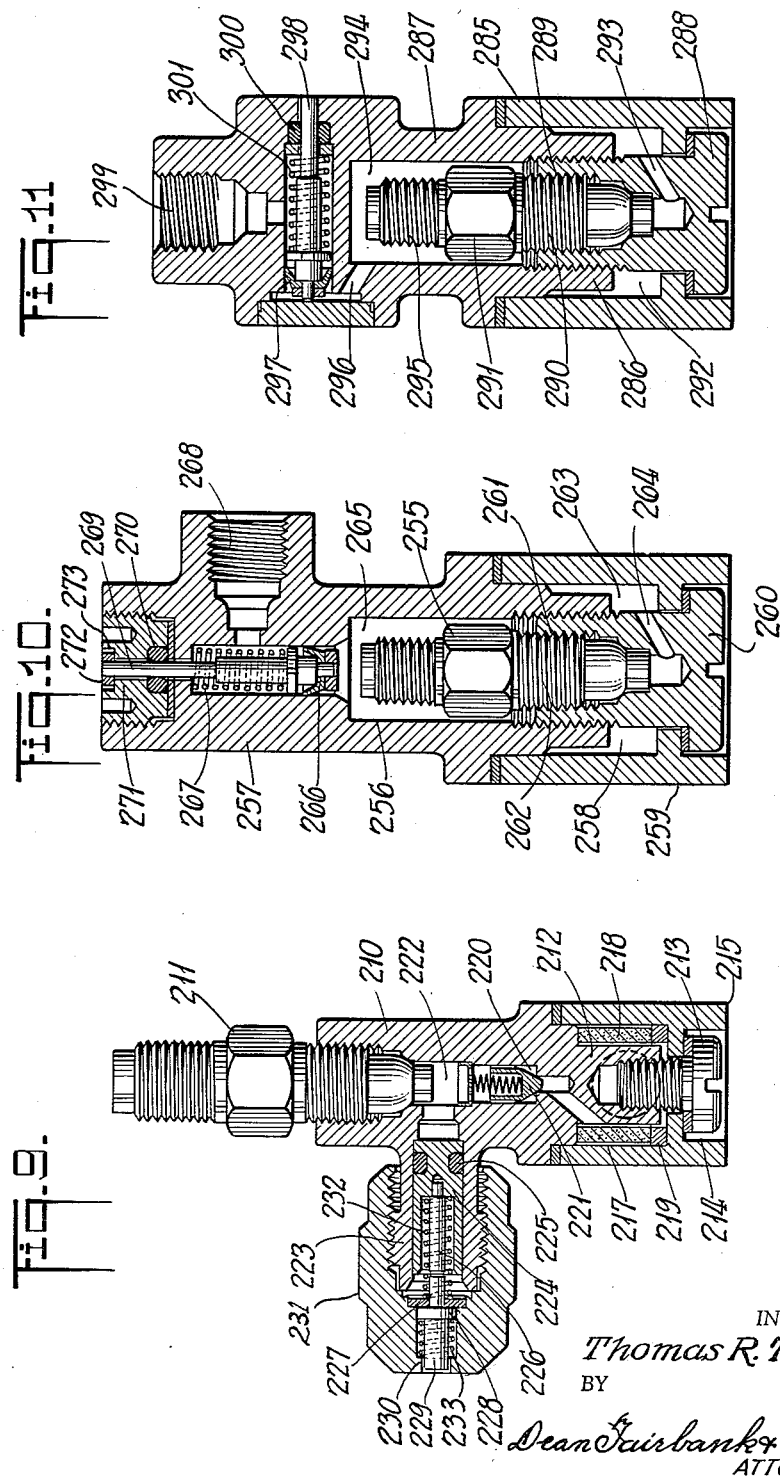

March 5, 1963 T. R. THOMAS 3,080,016
LUBRICATION

Filed Sept. 16, 1959 4 Sheets-Sheet 4

INVENTOR
Thomas R. Thomas
BY
Dean Fairbank & Hirsch
ATTORNEY

United States Patent Office 3,080,016
Patented Mar. 5, 1963

3,080,016
LUBRICATION
Thomas R. Thomas, New York, N.Y., assignor to Auto Research Corporation, Dover, Del., a corporation of Delaware
Filed Sept. 16, 1959, Ser. No. 840,441
11 Claims. (Cl. 184—7)

The present invention relates to a flow indicator meter unit fitting for branched lubricant distributing systems.

The present invention is particularly directed to flow meter units which are to serve as the outlets for a branched distributing lubricating installation and which will accordingly supply relatively minute quantities of lubricant to a plurality of widely distributed bearings, regardless of varying lubricant viscosities, climatic conditions, tubing and bearing resistances and central pump or supply source pressures.

In such a system a plurality of flow meter outlet unit fittings, which have obstructing effect tremendously greater than that of the bearings or tubing, so as to predominantly control the distribution of lubricant, will be mounted on the bearings or mounted at the outlets of the tubing system and connected to the bearings by means of tail pipes.

Although this type of meter unit fittings, which will either be of the pin-in-bore type or spiral restriction sleeve type, will be reliable in operation over many years and regardless of varying conditions, it is nevertheless desirable that indicator means be provided associated therewith, so as to indicate to the mechanic or machine operator that the meter unit is functioning in accordance with prescribed requirements.

It is, therefore, among the objects of the present invention to provide an indicator unit to be associated with meter units of the character described, which will reliably and accordingly determine the functioning of such meter units and which will indicate that line pressure is being adequately supplied to such meter units and that lubricant in turn is being fed to the bearings.

Another object is to provide an indicator device for flow meter units of the character described, which will be reliable in operation, may be readily observed, which will not unduly increase the bulk or expense of the meter unit and which at the same time will not impede effective operation of the meter units.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory according to one embodiment of the present invention to provide a series of pressure sensitive reciprocating devices which will cause projection of an indicator when pressure is applied to the system and which will gradually change to an inactive position after the pressure application has ceased and the lubricant has been distributed to the bearings.

In one preferred form a mounted junction is provided for the meter units, in which junction there are positioned a series of piston chambers, each of which piston chambers have a piston, the stem of which will be forced beyond the cap of the fitting so as to give a visual indication of lubricant pressure application. These pistons will normally be spring returned so that when the pressure application has been relieved, the spring pressure on the piston will return the piston as the lubricant is dispensed through the meter unit.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a side elevational view of one form of combination meter unit and pressure sensitive flow indicator device according to the present invention.

FIG. 2 is a side elevational view taken from the line 2—2 of FIG. 1.

FIG. 3 is a transverse sectional view taken upon the line 3—3 of FIG. 1, and upon an enlarged scale as compared to FIG. 1.

FIG. 4 is a side elevational view of a junction unit carrying three flow metering fittings projecting in parallel from one side of the fitting.

FIG. 5 is a transverse vertical sectional view taken upon the line 5—5 of FIG. 4.

FIG. 6 is a side elevational view showing an alternative form of junction unit with the indicators at one side of the junction fitting and the flow metering units at another side of the junction fitting and positioned in parallel.

FIG. 7 is a transverse vertical sectional view upon the line 7—7 of FIG. 6 upon an enlarged scale as compared to FIG. 6.

FIG. 8 is a fragmentary sectional view similar to FIG. 7 showing an alternative form of indicator unit.

FIG. 9 is a longitudinal sectional view showing an indicator unit with an indicator piston mounted in the side of the unit itself with the indicator pin being separate from the piston unit.

FIG. 10 is a longitudinal sectional view of an alternative embodiment in which the indicator piston and pin are aligned with the meter unit and are sensitive to the flow from the meter unit rather than before the meter unit.

FIG. 11 is a longitudinal sectional view similar to FIG. 10 in which the meter unit has a transversely operating piston and stem indicator responsive to flow from the meter unit.

Figure 12:
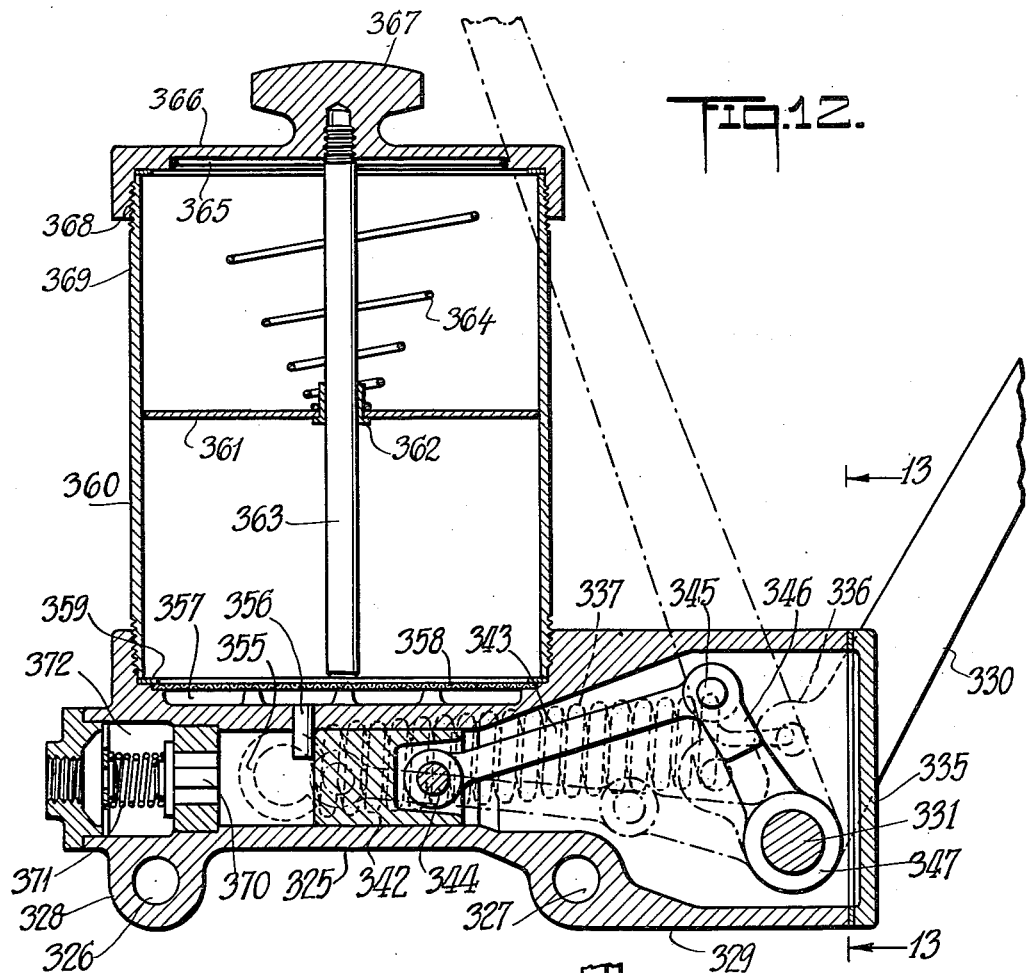
FIG. 12 is a transverse vertical section view of a high pressure pump unit for charging the units of FIGS. 1–11 with lubricant under pressure.

Referring to FIGS. 1 and 2 there is shown a junction mounting unit A which has a series of indicator piston members or fittings B and a plurality of flow outlet meter units C.

Referring particularly to FIG. 3 there is shown an elongated bar 10, which has the straps 11 at the end thereof held in position by the screws 12. These straps mount the unit A upon the machine part 13.

The bar 10 has the plurality of sockets or enlarged recesses 14, which have the bottom shoulder 15, the passages 16 and the bottom shallow recesses 17 with bottom clamping shelves. The cylinder body members or fittings 18 have shoulders 19, which are drawn up against the gaskets 20 resting on the top faces 21 of the bar 10 by the screws 22.

The heads 23 of the screws 22 are received in the recesses 17 and the gaskets 24 make a lubricant-tight connection. These screws are received in the threaded bores 25 which are formed in the extensions 26 from the lower portions of the body 18.

The extensions 26 have the transverse bores 27 connecting with the untapped pocket or extension 28 of the threaded bore. These through passages 27 will communicate with the opening or space 29 and permit flow of lubricant from the space 29 into the chamber 30 and then pass the ceramic filter plug 31, which is received in the socket 32 in the body 18.

The lubricant will then flow through the flow passageway 33 and past the check valve 34. The check valve 24 has a vinyl or silicon resin face and a metal disk back, and it is pressed into seating position against the valve seat 35 by means of the barrel spring 36. The barrel spring 36 is held in position by the cup 37 in the valve chamber 38.

The piston element 39 has the enlargements 40 and 41 between which is received the O-ring 42 of a neoprene rubber composition, which will make a lubricant-tight connection against the interior chamber 43 of the cylinder.

The end of the body 18 is threaded, as indicated at 44, and it receives the cap portion 45 of the cap 46. The cap 46, by its recess 47, will receive the upper end of the spring 48. The coil spring 48 will in turn fit around the extension 49 at the upper end of the piston 39 and will react against the shoulder 41 and press said piston down against the shoulder 50.

The top of the cap 46 has a passage 51, through which the stud extension 52 may be projected into dot and dash position, as indicated at 53, and give an indication effect.

The cap 46 has a corrugated or knurled outer portion 54, by means of which it may be grasped and turned. The side nipple 55 receives the threaded end 56 of the flow meter unit C.

The flow meter unit has a threaded outlet end 57 for attachment to a tubing tailpipe to a bearing. Generally, these indicators are grouped together as shown in FIG. 1 at a position remote from the bearings to which they are connected by tailpipes so that they may be readily observed in groups without the necessity of inspecting single scattered metering units as various positions in and about the machine, which would be necessary if they were mounted upon the bearings. This side nipple 55 has a tapered recess 58 which forms a lubricant-tight connection with a tapered nose 59 of the unit C.

In operation, the lubricant flows at the opening 60 into the junction unit A. The lubricant will be forced through the passage 27 past the ceramic filter 31, the valve 34 and forcing up the piston 39 to give an indication as indicated at 53. The lubricant will then flow outwardly through the flow meter unit C and into the bearing as indicated by the arrow 70.

When the central pressure source discontinues feeding lubricant into the junction 18, the piston 39 will be pressed down by the spring 48 and close valve 34. Thus the balance of the lubricant in the chamber 43 is forced past the outlet meter unit C.

Thus the piston units 39 will give an indication by means of their indicator stems 52 when the lubricant pressure is being applied to the unit C, and this indication will continue until the lubricant pressure has been discontinued and all lubricant in the line has been dispensed through the meter unit C and the pistons 39 have been returned by the springs 48.

There is thus provided a reliable indication of operation of each meter unit, with reassurance to the mechanism or operator of the machine. Ineffectiveness or break-down of any meter unit C will be indicated by either failure of the stem 52 to project upon pressure application of failure of the stem 52 to move back to its inside position after such pressure application.

This will enable a ready indication of operativeness of any and all meter units and will give assurance to the mechanic or operator that the meter units are in perfect functioning condition and will assure a proper distribution of lubricant to the bearings.

It is not necessary in the indicating metering devices of the present invention to use a multiple stroke pump and to pump up pressure until all of the indicators are out with the pump handle then being held out until all of the indicators have been inspected.

In the present invention a single operation of a high pressure pump may be utilized and the indicators may all be inspected during the one or two minute period that the pump is discharging and after the discharge is completed the units may all again be checked to determine whether all of the indicators have been returned.

If in any instance an indicator is not out while the pump is discharging or does not return after the pump has discharged this would indicate in the first instance that the filter may be clogged in the meter unit or in the second instance that the meter unit did not pass oil properly and therefore requires replacement or inspection and checking.

Referring to FIGS. 4 and 5 there is shown a junction bar 110 held in position by the straps 111 and the screws 112. Instead of the straps 111 and 112 it is possible to utilize mounting holes directly in the bar 110 itself. The bar 110 has a plurality of sockets 113 as shown in FIG. 5 each of which receives the lower nipple portion 114 of the fitting 115. This nipple portion has a tapped interior portion 116 which receives the threaded portion 117 of the clamping screw 118.

The shank 119 of the clamping screw 118 passes through the reduced diameter bore portion 120 and its enlarged head 121 will clamp the gasket 122 in position against the shoulder 123. The clamping screw 118 will also draw up the shoulder 124 against the top face 125 of the junction 110 compressing the gasket 126.

The lubricant is fed from the central source under pressure into the sockets 113 from the ends of the bar 110 and it will pass through the radial bores 127 into the chamber 128. Thence it will pass through the filter 129 held between the screens 130. The valve seat plug 131 has a central opening 132 to pass the lubricant under pressure against the valve 133 with the seating spring 134. The lubricant will then pass beyond the valve into the chamber 135 and through the flow metering fitting 136 in the direction 137. At the same time, the lubricant will press from the chamber 135 onto the piston face compressing the spring 149 in the chamber 138 and forcing the indicator 139 outwardly through the opening 140 in the cup 141 which is screwed into the tapped opening 142 in the side of the body 115. The gasket 143 will assure a lubricant-tight connection.

The flow metering unit 136 has machine threads 144 and 145 at its inlet and outlet ends with a tapered nose 146 forming a seal against the seat 147 at the outlet of the chamber 135.

In this device three meter units are shown in side by side relationship in FIG. 4 each with an indicator stem 139 projecting outwardly at right angles thereto. However, any number of meter units may be similarly indicated.

It will be noted that the piston 148 is of the same construction as the piston shown in the upper part of FIG. 3 and the essential difference between the unit of FIG. 3 and the unit of FIG. 5 is that the meter unit and indicator have been changed in position. In FIG. 5, the axis or axes of the meter units 136 intersects the longitudinal axis of the junction 110, while in FIG. 3, the axis or axes of the piston 39 intersects the axis of the meter unit A.

Referring to FIGS. 6 and 7 the meter units 165 are threaded in the sockets 166 in the top side 167 of the junction 168. Their tapered noses 169 are seated in lubricant-tight fashion against the rounded socket bottom portion 170 and receive lubricant under pressure through the opening or bore 171. The junction bar 168 has the openings 172 to receive mounting bolts.

At the sides 173 of the junction bar 168 there are positioned the indicator piston units 174 which are threaded into the tapped sockets 175. The tapped sockets 175 communicate with the chambers 176 which in turn receive lubricant under pressure from a central source.

The unit 174 carries the filter 177, as well as the spring seated valve unit 178 and it has a lubricant-tight connection by reason of the O ring 179 encircling a groove in the end thereof.

The transverse radial bore 180 will establish communication from the chamber 176 through the filter 177 past the valve 178 and into the bore 171 leading to the metering unit 165.

The piston unit 181 with its indicating stem 182 will be moved to the right upon lubricant pressure application and will move to the left upon release of the pressure. The unit of FIGS. 6 and 7 differs from the units of FIGS. 3 and 5 in that the indicator piston unit 174 carries a spring seated valve unit 178 as well as a strainer or filter unit 177 and the entire unit may be inserted or removed together directly from the junction bar 168 without affecting the attachment of the metering units 165 to the junction bar.

The body structures 18 of FIG. 3 and 115 of FIG. 5 have been eliminated in the structure of FIGS. 6 and 7 and the meter unit 165, as well as the indicator piston unit 174 are made as separate assemblies directly and separately attachable to the junction bar 168.

In the alternative form of FIG. 8 the junction bar 168 and the meter unit 165 are the same but the piston indicator unit 190 has been changed. It will be noted that the strainer unit 191 and the spring seated valve unit 192 are held in a separate body 193 which may be press fitted into the socket 194 and sealed in position by the gasket 195. The end 196 of the unit 193 will then be pressed in position by the nose 197 at the inner end of the body of the indicator piston assembly 190.

The piston 198 and the indicator stem 199 will function in the usual manner.

In FIG. 9 the body 210 receives the meter unit 211 and it has a nipple portion 212 which is held in position by the screw 213 in the socket 214 in the base of the junction bar 215.

The socket 217 in which the nipple 212 is inserted has a cylindrical filter or strainer unit 218 of ceramic or sintered metal which presses down against the sealing gasket 219. The body 210 also has a central chamber 220 receiving the spring seated conical plug valve 221 past which the lubricant is fed into the central chamber 222.

The body 210 also has a sidewardly projecting tubular projection or extension 223 which serves as a cylinder in which reciprocates the indicator piston 224 having the sealing O ring 225. This piston has a central pin 226 which contacts the stud member 227 extending inwardly from the disc 228. From the disc 228 there projects outwardly the indicator pin 229. The pin 229 reciprocates in the opening 230 at the end of the cap 231a. The disc 228 is normally biased to the right by the spring 231. The piston 224 is biased to the right by the coil spring 232 which encircles the shaft 226 inside of the recesses in the left end of the piston 224.

The unit of FIG. 9 differs from the units of FIGS. 3, 5 and 7 in that the indicator piston is separate from the indicator pin and in that the indicator piston fits in a tubular extension on the side of the body mounted on the junction bar 215. The cap 231a holds the piston in position in the tubular extension 223 without forming an assembly within which the piston is received.

In FIGURE 10 the meter unit 255 is enclosed within the recess 256 in the body 257 which is mounted in the socket 258 in the junction bar 259 by the screw 260. The screw 260 in this instance has a tapped socket 261 which carries the threaded inlet end 262 of the meter unit 255. The meter unit receives lubricant from the chamber 263 through the bore 264 and passes the lubricant into the chamber 265. From the chamber 265 the lubricant presses upwardly upon the piston 266 against the spring 267 until lubricant passes into the outlet chamber 268. The piston 266 has a connecting stem extension 269 sealed by the O ring 270 which passes through the plug 271. The end of the stem 269 has a ring 272 which will normally fit in the recess 273. When, however, lubricant passes the meter unit it will raise the piston 266 and indicate flow of lubricant into the outlet chamber 268.

The piston 266 and the spring 267 are responsive to much lower pressures in the unit of FIG. 10 since the pressure has been primarily taken up by the flow pass the meter unit 255 and therefore the piston 266 is set directly in the path of the lubricant from the meter unit 255 into the outlet socket 268.

In the unit of FIG. 11, the junction 285 receives the nipple 286 of the body 287 because of the screw clamping member 288. The screw clamping member has a threaded socket 28a which receives the threaded inlet end 290 of the meter unit 291. The lubricant will flow from the junction socket 292 through the bore 293 through the meter unit 291 into the outlet socket or recess 294 within the body 287.

The threaded outlet end 295 of the meter unit 291 feeds lubricant into the chamber 294 from which it flows through the oblique bore 296 and presses on the piston 297 with the indicator pin 298. The indicator pin moves to the right as the lubricant flows into the oulet chamber 299. The O ring 300 will form a seal for the stem 298 and the coil spring 301 will bias the piston to the left.

The unit of FIG. 11 differs from the unit of FIG. 10 in that the pin reciprocates transversely of the axis of the meter unit and body 287 rather than in line with such axis, as shown in FIG. 10.

In FIG. 12 is shown a pump which may be utilized to give the high pressure single operation necessary to force out all of the indicator stems of the units of FIGS. 1 to 11.

Figure 13:
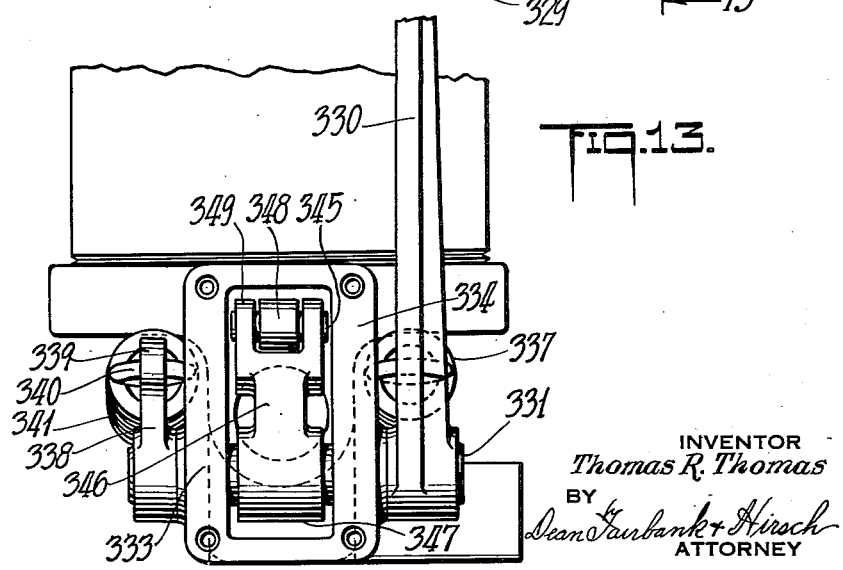
FIG. 13 is a fragmentary transverse side elevational view taken from the line 13—13 of FIG. 12.

The pump of FIGS. 12 and 13 has a pump body 325 which may be mounted by the openings 326 and 327 in the enlarged portions 328 and 329. The lever 330 is mounted upon the shaft 331 which extends through the side walls 333 and 334 normally covered by the cap 335. The handle has an ear 336 to which is attached the heavy coil spring 337 and on the opposite side there is also provided an upstanding extension 338 having an eye 339 also receiving the end 340 of the heavy coil spring 341.

The reciprocatory piston 342 is connected to the link 343 by the transverse pivot pin 344. The rear end of the link has a pivotal connection at 345 to the arm 346 which terminates in the eye 347 fixed onto the shaft 331. The rear end of the link 343 terminates in the eye 348 which fits between the clevis jaws 349 at the upper end of the lever 346.

The piston 342 upon its rightward stroke will draw lubricant down into the chamber 355 through the inlet connection or slot 356 from the shallow chamber 357 below the filter screen 358. The screen is held in position together with the peripheral gasket 359 by the cylindrical reservoir body 360. The reservoir body 360 may receive a follower member 361 where a heavy lubricant is used but this follower member 361 may be omitted with more readily flowable liquid lubricants.

The follower member 361 has a central sleeve 362 sliding on the shaft 363. The follower is pressed downwardly by the spring 364 which at its upper end fits in the recess 365 in the removable cover 366 having the handle member 367.

The cover 366 has a depending interiorly threaded skirt 368 which screws down upon the upper threaded portion 369 of the reservoir 360. The lubricant will pass from the piston chamber 355 past the reciprocatory valve 370 which is forced open against the spring 371 to permit the lubricant to flow into the outlet chamber 372.

Once the piston cuts off the inlet 356 the lubricant passes under high pressure through the distributing system to lift the indicators. The springs 337 and 340 are sufficiently heavy to give 400 to 600 lbs. pressure per square inch. To stress the springs 337 and 341, the handle 330 is forced back into the solid line position as shown in FIG. 12. Then under the force of the stressed springs 337 and 341, the piston 342 returns, cutting off the inlet 356. The lubricant then will be forced under high pressure into the distributing system to the various units of FIGS. 1 to 11.

This single operation pump should cause all of the indicator stems to project if they are properly operating and after the pressure discharge is complete, following a period of discharge of several minutes, the stems then all being returned so that there may be an inspection made both for the stems projecting during the pump discharge and their return following the pump discharge, to ascertain whether any filters have been clogged or whether any meter units have not passed the oil properly.

The indicators may be placed either horizontally, as for example shown in FIGS. 4, 5, 6, 7, 8, 9 and 11, or vertically as shown in FIGS. 3 and 10.

The filters may be in a separate cartridge as indicated in FIG. 8 apart from the indicator unit or in a single unit with the indicator unit as shown in FIG. 7.

Instead of separate stations for carrying the meter units and the indicator units, as shown in FIGS. 1 to 5, all units may be mounted directly upon the junctions as indicated in FIGS. 6, 7 and 8.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A lubricant flow indicator meter unit combination comprising a junction device receiving lubricant under pressure and a piston-cylinder indicator member connected with the inlet of the flow meter unit, said junction device including an elongated receptacle member having an enlarged recess at one side thereof and a shallow recess at the other side thereof with an intervening inwardly projecting clamping shelf between said recesses and said piston-cylinder indicator member having a body with a shoulder to abut one side of said junction device and a projecting inlet portion received in said enlarged recess and having a threaded end portion and a threaded clamp member threaded to said threaded end portion and having an enlarged head clamped against said shelf to hold the inlet portion in said junction device.

2. A lubricant flow indicator meter unit combination comprising a junction device receiving lubricant under pressure and a piston-cylinder indicator member connected with the inlet of the flow meter unit, said piston-cylinder indicator having a projecting stem which is projected upon pressure application and withdrawn upon cessation of pressure application, said junction device including an elongated receptacle member having an enlarged recess at one side thereof and a shallow recess at the other side thereof with an intervening inwardly projecting clamping shelf between said recesses and said piston-cylinder indicator member having a body with a shoulder to abut one side of said junction device and a projecting inlet portion received in said enlarged recess and having a threaded end portion and a threaded clamp member threaded to said threaded end portion and having an enlarged head clamped against said shelf to hold the inlet portion in said junction device.

3. A lubricant flow indicator meter unit combination comprising a junction device receiving lubricant under pressure and a piston-cylinder indicator member connected with the inlet of the flow meter unit, said meter unit being positioned in a threaded side nipple, said junction device including an elongated receptacle member having an enlarged recess at one side thereof and a shallow recess at the other side thereof with an intervening inwardly projecting clamping shelf between said recesses and said piston-cylinder indicator member having a body with a shoulder to abut one side of said junction device and a projecting inlet portion received in said enlarged recess and having a threaded end portion and a threaded clamp member threaded to said threaded end portion and having an enlarged head clamped against said shelf to hold the inlet portion in said junction device.

4. A lubricant flow indicator meter unit combination comprising a junction device receiving lubricant under pressure and a piston-cylinder indicator member connected with the inlet of the flow meter unit, said piston-cylinder indicator having a cylinder chamber, a double ridged piston and an O-sealing ring in the recess between said ridges, said junction device including an elongated receptacle member having an enlarged recess at one side thereof and a shallow recess at the other side thereof with an intervening inwardly projecting clamping shelf between said recesses and said piston-cylinder indicator member having a body with a shoulder to abut one side of said junction device and a projecting inlet portion received in said enlarged recess and having a threaded end portion and a threaded clamp member threaded to said threaded end portion and having an enlarged head clamped against said shelf to hold the inlet portion in said junction device.

5. A lubricant flow indicator meter unit combination comprising a junction device receiving lubricant under pressure and a piston-cylinder indicator member connected with the inlet of the flow meter unit, said junction device carrying a filter and spring-seated disk check valve for said meter unit, said junction device including an elongated receptacle member having an enlarged recess at one side thereof and a shallow recess at the other side thereof with an intervening inwardly projecting clamping shelf between said recesses and said piston-cylinder indicator member having a body with a shoulder to abut one side of said junction device and a projecting inlet portion received in said enlarged recess and having a threaded end portion and a threaded clamp member threaded to said threaded end portion and having an enlarged head clamped against said shelf to hold the inlet portion in said junction device.

6. In a centralized branched lubricating system to supply relatively minute, yet accurately proportioned quantities of lubricant to a plurality of widely distributed bearings, a multiple outlet junction metering unit comprising an elongated rectangular junction block having end, top, side and bottom faces, an inlet for lubricant at one end face and an outlet at the other end face and a through flow passage between the inlet and the outlet, a plurality of deep vertical sockets in the top face communicating with said passage and a plurality of shallow vertical sockets in the bottom face, said sockets communicating in a vertical passage extending between the deep and shallow sockets in the body of the block, fittings with upper and lower ends, each having a lower unthreaded projecting insert member with a threaded socket at the lower end and sockets at the upper end communicating with each other and with the lower threaded socket, said inserts fitting into said deep junction sockets and means to clamp said fittings into said deep sockets, said clamping means fitting into said shallow sockets and metering and indicating units fitting into said upper end sockets of the fittings.

7. The unit of claim 6, each said fitting having a strainer in the bottom of said lower threaded socket and a valve in the bottom of one of said upper sockets.

8. The unit of claim 6, said clamping means including a clamping screw having a threaded portion extending into said threaded socket and drawing each said fitting against the top face of the junction block and a transverse passageway through the side of the insert member to permit flow from the deep socket into the lower socket of the insert member.

9. The unit of claim 6, said upper end sockets being positioned at right angles to each other and said indicating units consisting of a reciprocating spring return piston unit having an elongated extension rod to extend out of or to be retracted within one of said upper end sockets and a flow metering element screwed into the other one of said upper end sockets.

10. The unit of claim 6, said fittings each having an elongated body with aligned end projecting nipples and a central passageway between said nipples, strainer and valve means in said central passageway and threaded connections at the ends of said nipples respectively for the connection of the block to an outlet metering element and an indicating unit positioned between the valve and the flow metering element.

11. The unit of claim 6, said shallow vertical sockets receiving clamping bolts to extend through said vertical passage and hold the projecting insert member in the deep socket and in communication with the through passage.

References Cited in the file of this patent

UNITED STATES PATENTS

| | | |
|---|---|---|
| 2,064,877 | Bijur | Dec. 22, 1936 |
| 2,206,335 | Rotter et al. | July 2, 1940 |
| 2,229,655 | Kocher | Jan. 28, 1941 |
| 2,526,568 | Leonard | Oct. 17, 1950 |
| 2,719,603 | Le Clair | Oct. 4, 1955 |

FOREIGN PATENTS

| | | |
|---|---|---|
| 16,707 | Great Britain | of 1896 |